No. 825,885. PATENTED JULY 17, 1906.
J. ALLEN.
PRUNING DEVICE.
APPLICATION FILED SEPT. 2, 1905.

Witnesses:
Fred S. Greenleaf.
Bertrand Simonds.

Inventor.
Jefferson Allen,
by Crosby Gregory.
Att'ys

UNITED STATES PATENT OFFICE.

JEFFERSON ALLEN, OF KENNEBUNK PORT, MAINE.

PRUNING DEVICE.

No. 825,885.　　　　Specification of Letters Patent.　　　Patented July 17, 1906.

Application filed September 2, 1905. Serial No. 276,863.

*To all whom it may concern:*

Be it known that I, JEFFERSON ALLEN, a citizen of the United States, residing at Kennebunk Port, in the county of York and State of Maine, have invented an Improvement in Pruning Devices or Branch-Cutters, of which the following description, in connection with the accompanying drawings, is a specification, like characters on the drawings representing like parts.

Great difficulty is experienced in removing from trees the outer ends or tips of branches on which caterpillars and moths and the like have built their nests. I have devised a very simple device for this purpose, that I will now describe.

Figure 1:
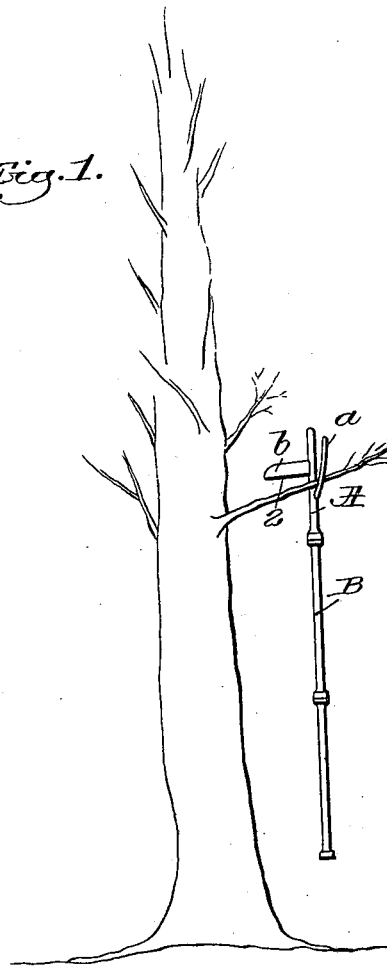
Figure 2:
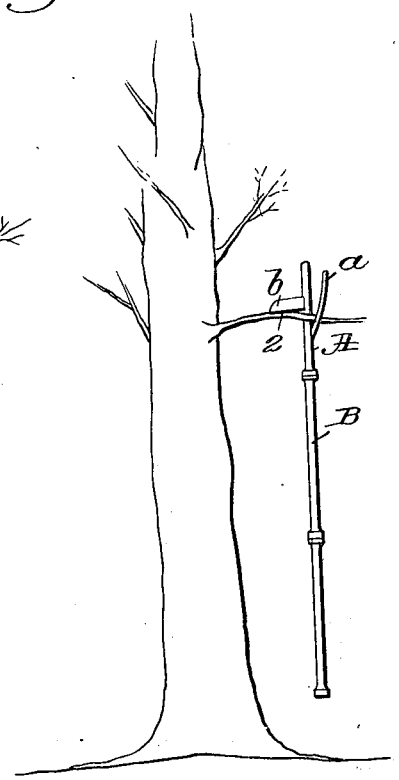
Figure 3:
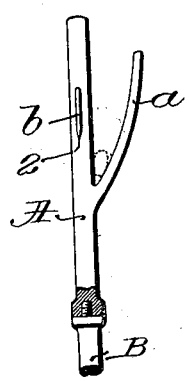

Figure 1 shows the device as being put into position on a branch to be cut off. Fig. 2 shows the device turned into its operative position. Fig. 3 shows the device on a larger scale, looking at the same in another direction, the dotted line showing a branch that is engaged by the arm of the device.

The device comprises a metallic head A, the lower end of which is adapted to be fixed to a suitable pole B either by screwing the pole into a hole in the head or in any other suitable manner. The pole may be jointed after the manner of fishing-rods, and thus be made of any desired length, according to the height of the branch to be cut off. The head will have extended therefrom an arm $a$, preferably occupying a diagonal position with relation to the length of the head, so as to enable the branch to be cut off to be held, as shown in Figs. 1 and 3, at the junction of the head and arm. Above this arm and between the same and the top of said head I connect with said head a knife or blade $b$, the under or cutting edge 2 of which is inclined downwardly from said head toward the end of the knife or blade.

The butt-end of the knife or blade will be secured firmly to the head in any suitable manner, and after the head, mounted on the pole, has been raised until the arm $a$ contacts with the branch to be cut off and said branch is thus located against the side of the head the head will be rotated slightly in a direction to enable the edge of the knife or blade to be put on top of the branch, and with the knife or blade contacting with the top of the branch sustained between the arm and head the pole and head will be drawn down, and the knife or blade will cut off the branch with a clean cut.

It will be noted that the point where the knife is joined to the head is in a different plane, viewed with relation to the longitudinal axis of the head, than the arm.

Having described my invention, what I claim as new, and desire to secure by Letters Patent, is—

1. In a pruning implement, a head having a branch-locating arm, and a blade adapted to sever the branch while located by the arm.

2. A pruning implement comprising a head having an upwardly-directed arm for engaging and locating a branch to be cut, and a laterally-extending blade for severing the branch while located by the arm.

3. A pruning implement comprising a head having an upwardly-directed arm for engaging and locating a branch to be cut, and a blade extending outwardly from the head and provided with a cutting edge on its lower side.

4. A pruning implement comprising a head having an upwardly-directed arm for engaging and locating a branch to be cut, and a blade extending outwardly from the head and provided with a cutting edge on its lower side, said blade and arm occupying different radial planes.

5. A pruning implement comprising a head having an upwardly-directed branch-locating arm and a blade extending laterally from the head at a point between the upper and lower ends of said arms.

6. A pruning implement comprising a head having an upwardly-directed branch-locating arm and a blade extending laterally from the head at a point between the upper and lower ends of said arms, said blade and arm lying in different radial planes.

7. In a pruning implement, a head having an upwardly-directed branch-locating arm, and a blade extending laterally from the head and having a lower cutting edge, said blade being situated between the upper and lower ends of the arm, the blade and arm being situated in radial planes substantially ninety degrees apart.

In testimony whereof I have signed my name to this specification in the presence of two subscribing witnesses.

JEFFERSON ALLEN.

Witnesses:
　ANTON GREEN,
　GEO. GOODWIN.